United States Patent
Lairie et al.

(10) Patent No.: US 10,543,968 B2
(45) Date of Patent: Jan. 28, 2020

(54) LOW PROFILE, WRAPPABLE ELONGATE MEMBERS SPACER AND METHOD OF MAINTAINING ELONGATE MEMBERS IN FIXED, SPACED RELATIVE RELATION

(71) Applicant: FEDERAL-MOGUL POWERTRAIN, LLC, Southfield, MI (US)

(72) Inventors: Marc Lairie, Corbeil-Essonne (FR); Jean-Rene Chesnais, Crepy en Valois (FR)

(73) Assignee: Federal-Mogul Powertrain LLC

( * ) Notice: Subject to any disclaimer, the term of this patent is extended or adjusted under 35 U.S.C. 154(b) by 109 days.

(21) Appl. No.: 15/856,634

(22) Filed: Dec. 28, 2017

(65) Prior Publication Data

US 2018/0118433 A1    May 3, 2018

Related U.S. Application Data

(62) Division of application No. 14/733,031, filed on Jun. 8, 2015, now Pat. No. 9,856,061, which is a division
(Continued)

(51) Int. Cl.
| | |
|---|---|
| *B65D 63/10* | (2006.01) |
| *F16L 3/223* | (2006.01) |
| *H02G 3/30* | (2006.01) |
| *F16L 3/237* | (2006.01) |
| *F16L 3/233* | (2006.01) |

(52) U.S. Cl.
CPC ........ *B65D 63/1009* (2013.01); *F16L 3/2235* (2013.01); *F16L 3/233* (2013.01); *F16L 3/237* (2013.01); *H02G 3/30* (2013.01); *Y10T 24/14* (2015.01); *Y10T 29/49895* (2015.01); *Y10T 428/14* (2015.01); *Y10T 428/28* (2015.01)

(58) Field of Classification Search
None
See application file for complete search history.

(56) References Cited

U.S. PATENT DOCUMENTS

| | | | | |
|---|---|---|---|---|
| 2,000,763 A | * | 5/1935 | Lane | ...................... B65D 57/00 206/813 |
| 4,438,294 A | * | 3/1984 | Meltsch | ............... H02G 15/013 174/88 R |

(Continued)

FOREIGN PATENT DOCUMENTS

| | | |
|---|---|---|
| DE | 7533213 U | 2/1976 |
| EP | 1746323 A1 | 1/2007 |
| WO | 1995011400 A1 | 4/1995 |

*Primary Examiner* — Barbara J Musser
(74) *Attorney, Agent, or Firm* — Robert L. Stearns; Dickinson Wright PLLC

(57) ABSTRACT

A low profile, wrappable spacer and method for maintaining a pair of elongate members in fixed, spaced relation to one another is provided. The wrappable spacer includes a flexible elongate body having oppositely facing inner and outer faces extending along laterally spaced, lengthwise extending edges between opposite ends. The inner face has an adhesive surface. At least one member extends between the edges transversely to the lengthwise extending edges. The member extends outwardly from the adhesive surface, wherein the adhesive surface is configured for adhesion to at least one of the member, the elongate members or the outer face.

4 Claims, 4 Drawing Sheets

Related U.S. Application Data of application No. 12/942,309, filed on Nov. 9, 2010, now Pat. No. 9,062,802.

(60) Provisional application No. 61/259,284, filed on Nov. 9, 2009.

(56) References Cited

U.S. PATENT DOCUMENTS

| | | |
|---|---|---|
| 5,620,158 A | 4/1997 | Rodondi et al. |
| 5,755,013 A | 5/1998 | Fitch et al. |
| 2002/0043592 A1 | 4/2002 | Frazier |

* cited by examiner

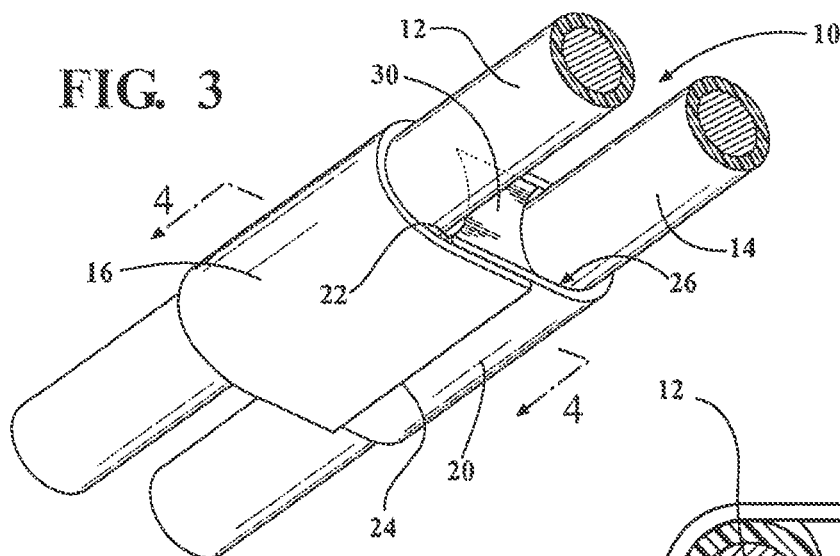
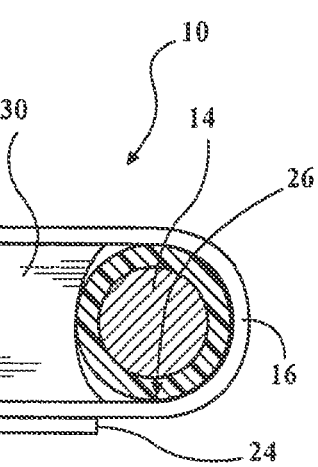
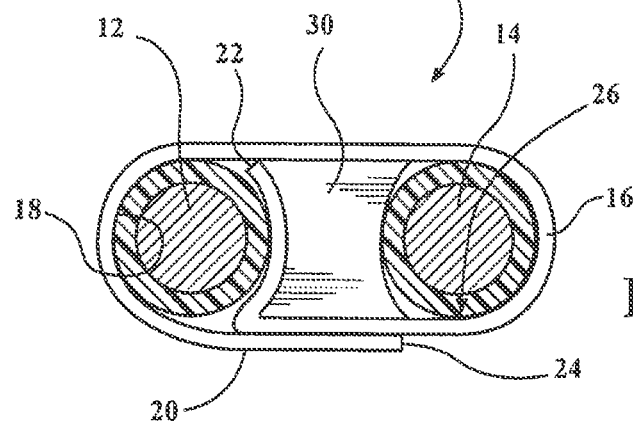
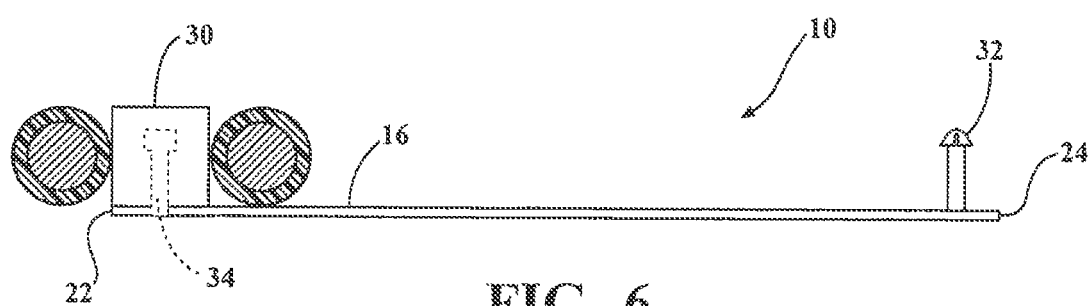

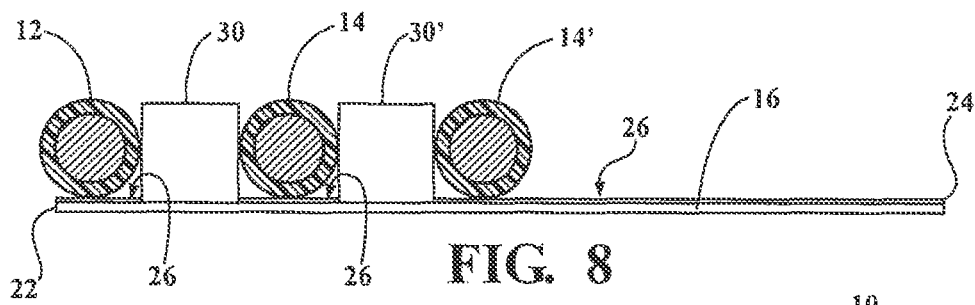
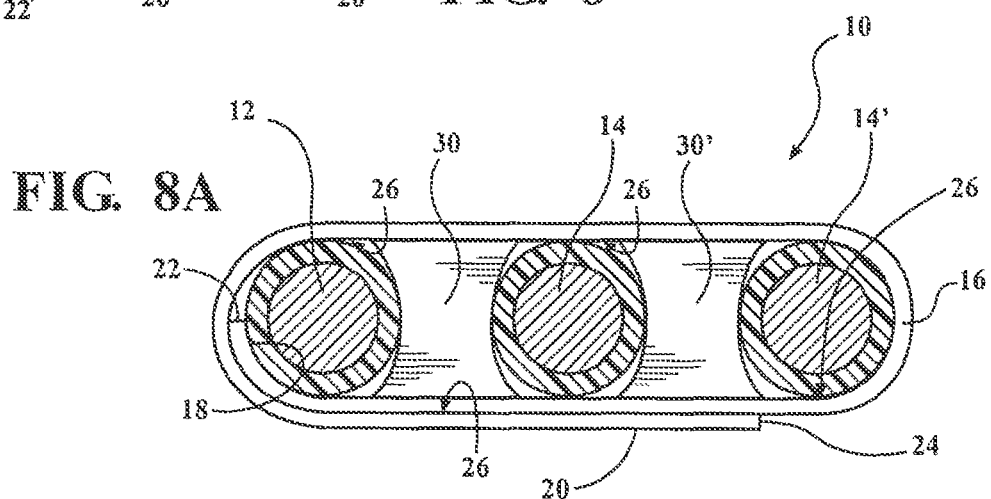
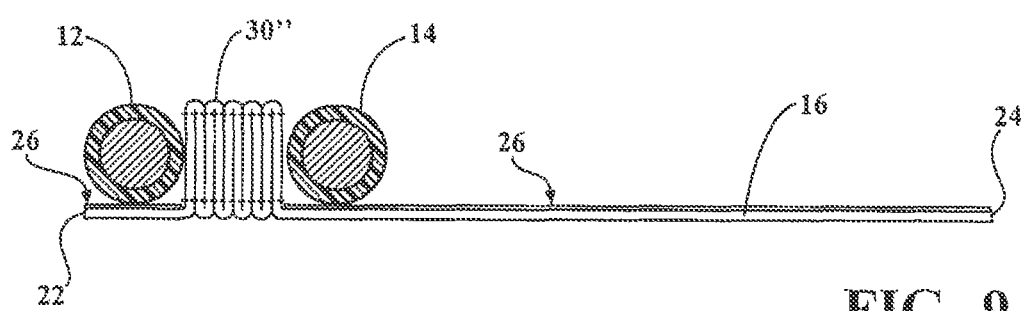
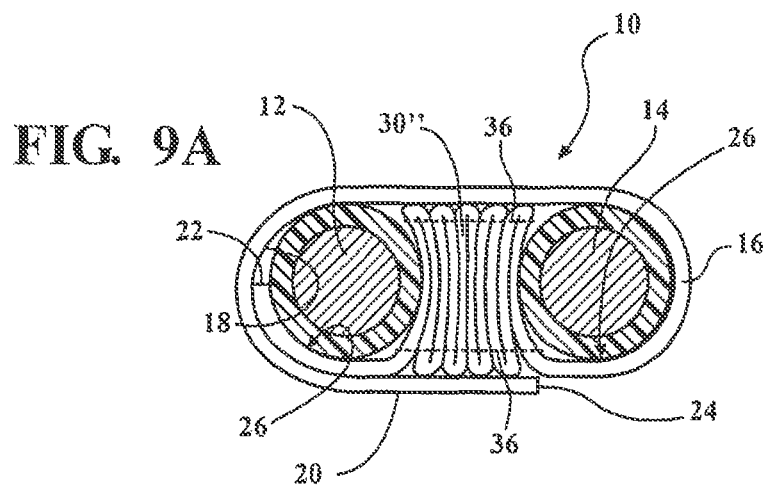

LOW PROFILE, WRAPPABLE ELONGATE MEMBERS SPACER AND METHOD OF MAINTAINING ELONGATE MEMBERS IN FIXED, SPACED RELATIVE RELATION

CROSS-REFERENCE TO RELATED APPLICATIONS

This divisional application claims the benefit of U.S. Divisional application Ser. No. 14/733,031, filed Jun. 8, 2015, now U.S. Pat No. 9,586,061, U.S. Utility application Ser. No. 12/942,309, filed Nov. 9, 2010 now U.S. Pat. No. 9,062,802, and U.S. Provisional Application Ser. No. 61/259,284, filed Nov. 9, 2009, all of which are incorporated herein by reference in their entirety.

BACKGROUND OF THE INVENTION

1. Technical Field

This invention relates generally to apparatus for maintaining parallel elongate members, such as tubes or cables, in spaced, fixed relation relative to one another.

2. Related Art

Typically in routing elongate members, such as wires, cables, tubes, and the like, it is desired to maintain the elongate members in parallel, spaced and fixed relation relative to one another, such that the elongate members are prevented from relative rotation and translation. Further, it is commonly desired to minimize the weight and profile of components added to accomplish the spacing and fixing function. Currently, it is known to use plastic clips, such as those having a generally figure 8 shape with broken ends, to attach parallel elongate members to one another. The broken ends allow the clips to be spread apart for disposal over the respective elongate member. However, drawbacks exist for these types of devices. For example, these types of clips generally do not fix the elongate members against relative translation and rotation, and further, they are typically constructed for use with a single, predetermined diameter elongate member. As such, for applications having a plurality of diameters of elongate members, different sizes of the clips need to be stocked.

Other types of clips presently utilized have a figure 8 shape with closed loop ends. These clips are slid over predetermined diameter elongate members, and since they have closed ends, they must be slid over an end of the elongate members prior to attaching connectors or fittings to the ends of the elongate members. And so, aside from these types of clips also not fixing the elongate members against relative translation and rotation, they typically create inefficiencies in assembly, and generally prove cumbersome to use in areas of limited access. Further, in addition to the troublesome aspects discussed above, currently known clips are generally rigid and bulky, and thus, do not lend themselves to be concealed in applications requiring a low, generally flat profile.

SUMMARY OF THE INVENTION

In accordance with one aspect of the invention, a low profile, wrappable spacer for maintaining a pair of elongate members in fixed, spaced relation to one another is provided. The wrappable spacer includes a flexible elongate body having oppositely facing inner and outer faces extending along laterally spaced, lengthwise extending edges between opposite ends, wherein the inner face has an adhesive surface. Further, at least one member extends between the edges transversely to the lengthwise extending edges. The member extends outwardly from the adhesive surface for receipt between the elongate members.

In accordance with another aspect of the invention, a low profile, wrappable spacer in combination with a plurality of elongate members to be maintained in fixed, spaced relation relative to one another is provided. The wrappable spacer includes a flexible elongate body having an inner face and outer face facing away from the inner face. The inner and outer faces are bounded by opposite edges extending along a length of the body between opposite ends. The length is sufficient to allow the opposite ends to overlap one another upon wrapping the body about the elongate members. Further, at least one member extends outwardly from the inner surface and transversely to the length between the opposite edges. The member has a height extending outwardly from the adhesive surface sufficiently for receipt between the pair of elongate members to maintain the elongate members in their spaced relation.

In accordance with another aspect of the invention, a method of maintaining a plurality of elongate members in fixed, spaced and generally parallel relation to one another is provided. The method includes aligning the plurality of elongate members in generally parallel relation with one another. Further, providing a flat, flexible elongate body having opposite inner and outer faces extending between opposite ends with the inner face having an adhesive surface, with at least one member extending outwardly from the adhesive surface. Next, disposing the member between a pair of adjacent elongate members. Then, wrapping the elongate body completely about the elongate members and bringing the opposite ends into overlapping relation with one another and adhering the adhesive surface to at least one of the outer face or the elongate members.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 3 is a partial perspective view of the wrappable spacer of FIG. 1 shown wrapped about a pair of elongate members;

FIG. 4 is a cross-section view taken generally along line 4-4 of FIG. 3;

FIG. 5 is a view similar to FIG. 4 showing the wrappable spacer of FIG. 1 wrapped in a different configuration about a pair of elongate members;

FIG. 6 is a plan view of a low-profile, wrappable spacer constructed in accordance with another aspect of the invention shown unwrapped and unassembled;

FIG. 8 is a side elevation view of a wrappable spacer constructed according to another aspect of the invention;

FIG. 8A is a view similar to FIG. 4 showing the wrappable spacer of FIG. 8 wrapped about a plurality of elongate members;

FIG. 9 is a side elevation view of a wrappable spacer constructed according to another aspect of the invention; and FIG. 9A is a view similar to FIG. 4 showing the wrappable spacer of FIG. 9 wrapped about a pair of elongate members.

DETAILED DESCRIPTION OF PRESENTLY PREFERRED EMBODIMENTS

Referring in more detail to the drawings, FIGS. 1-4 illustrate a low-profile, wrappable spacer 10, referred to hereafter simply as spacer, constructed in accordance with one aspect of the invention. As shown in FIGS. 3 and 4, the spacer 10 is wrappable about a plurality of elongate members, shown by way of example and without limitation as a pair of elongate members 12, 14, such as a wires, tubes, cables, or the otherwise, to maintain the elongate members 12, 14 in spaced, fixed and generally parallel relation relative to another, thereby preventing relative translation and rotation of the elongate members 12, 14. The spacer 10 is lightweight and has a low, flat or substantially flat profile, thereby not contributing to the overall outer envelope of the fixed elongate members 12, 14 beyond the relatively thin wall thickness (t), or in the areas in which the spacer overlaps itself (2t), of the spacer 10.

Figure 1:
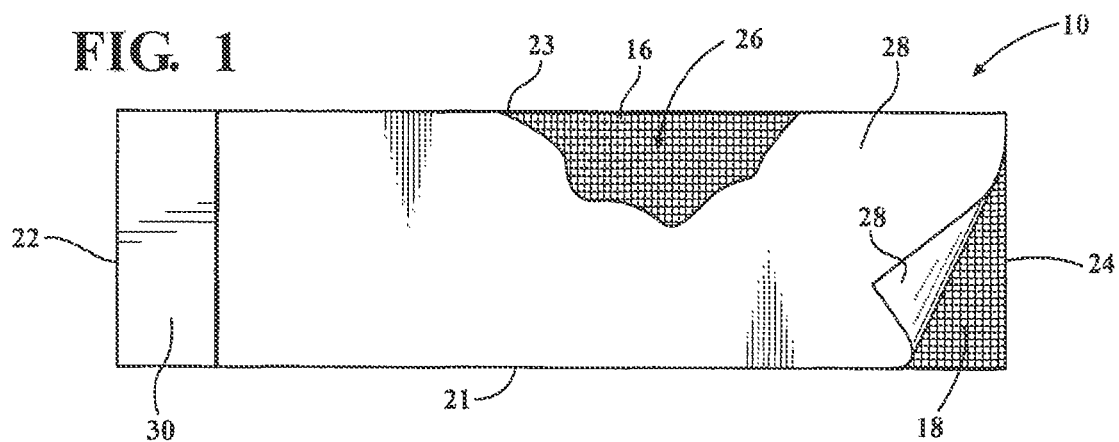
FIG. 1 is a plan view of a low-profile, wrappable spacer constructed in accordance with one aspect of the invention shown unwrapped and unassembled.
Figure 1A:
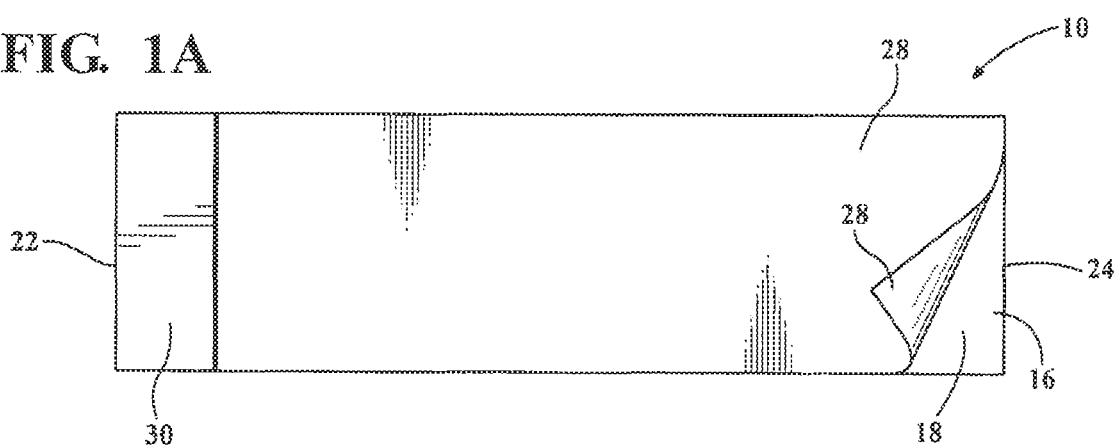
FIG. 1A is view similar to FIG. 1 of a low-profile, wrappable spacer constructed in accordance with another aspect of the invention shown unwrapped and unassembled.
Figure 2:
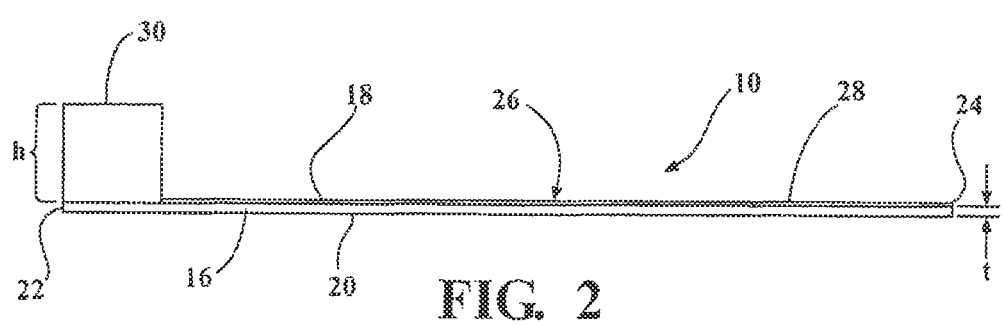
FIG. 2 is a side elevation view of the wrappable spacer of FIG. 1.

The spacer 10 has a flat, flexible elongate body 16 with opposite faces, also referred to as sides 18, 20, facing away from one another and extending along laterally spaced, opposite lengthwise extending edges 21, 23 between opposite ends 22, 24. As such, the body 16 has a width extending between the edges 21, 23 and a length extending between the opposite ends 22, 24. One of the sides 18 has an adhesive applied thereto to provide and adhesive surface 26 over the entire or substantially the entire side 18 to facilitate assembly and fix the elongate member 12, 14 against relative movement. The adhesive surface 26 can be provided in a variety of ways, such as via a pressure sensitive adhesive, for example. Further, to avoid contaminating of the adhesive surface 26 prior to assembly of the spacer 10 about the elongate members 12, 14, a release paper 28 can be applied over the adhesive surface 26. The release paper 28 can be selectively removed during assembly to expose the desire portion of the underlying adhesive surface 26, including all or a select portion of the underlying adhesive surface 26. It should be recognized that the body 16 can be constructed having any suitable width (extending between the edges 21, 23) and length (extending between the ends 22, 24) to accommodate being wrapped about the elongate members 12, 14. Accordingly, the spacer 10 is suitable for being wrapped about varying diameters of elongate members 12, 14, including elongate members 12, 14 having different diameters from one another (FIG. 7, 7A), and length segments of elongate members 12, 14. Further, the body 16 can be constructed from an impervious, flexible film or sheet material, bonded fibers, such as paper, felt, or a nonwoven material, as shown in FIG. 1A, or from interlaced yarns or desired materials, wherein the yarns can be interlaced with one another in a weaving, knitting, braiding, or crocheting process, as shown in FIG. 1. Any suitable material can be used as long as they can withstand the application environment. For example, thermoplastics, such as PETP or Nylon, thermoplastic elastomers, such as TPE or elastomers, can be used.

Figure 6A:
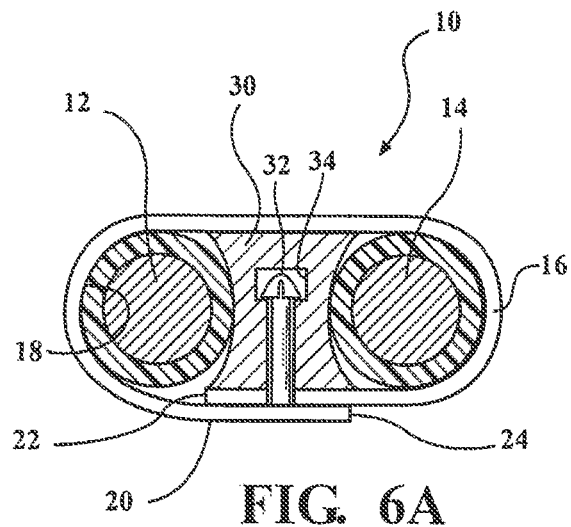
FIG. 6A is a view similar to FIG. 4 showing the wrappable spacer of FIG. 6 wrapped about a pair of elongate members.

It should be recognized that other attachment and fixation mechanisms are contemplated, such as the body 16 being made of elastic materials having a high coefficient of friction wherein the elastic recovery force generates sufficient friction against the elongate members 12, 14 to prevent their relative rotation and translation. In a case where an adhesive is not utilized to cover the surface 18 in whole or in part, alternate attachment mechanisms can be used to attach the overlapping portion of the body 16, such as shown in FIGS. 6 and 6A, for example, where a portion 32 of a fastener is attached adjacent one end 22 of the body 16 and another portion 34 of the fastener is attached adjacent the other end 24 of the body 16. The fastener could be provided as a clip, snap, grommet, staple, hook and loop, welding, or hotmelt adhesive, for example. Otherwise, the body 16 could also be provided with an adhesive surface in combination with the fastener, or further, formed of a self-adhering body, such as self-curing silicone tape that will permanently adhere to itself without applying a secondary adhesive.

Figure 7:
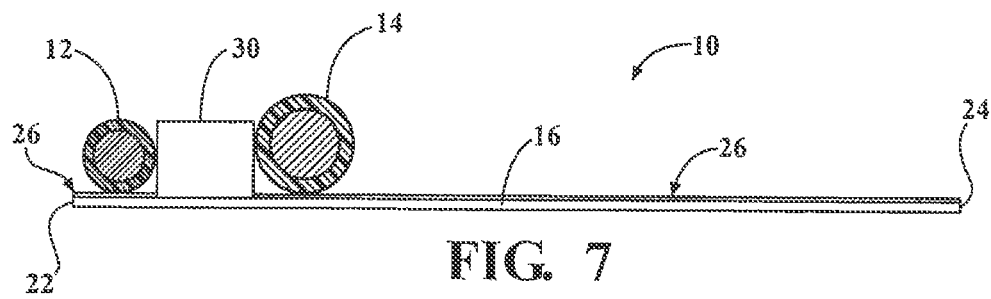
FIG. 7 is a plan view of a low-profile, wrappable spacer constructed in accordance with another aspect of the invention shown unwrapped and unassembled.
Figure 7A:
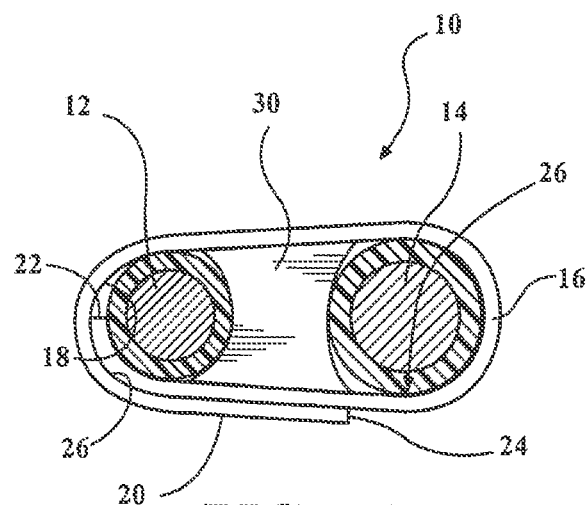
FIG. 7A is a view similar to FIG. 4 showing the wrappable spacer of FIG. 7 wrapped about a pair of elongate members.

The spacer 10 has a protrusion 30, also referred to as spacer member or simply member, fixed to the side 18 having the adhesive surface 26, and can be conveniently fixed to the side 18 via the adhesive surface 26 with at least a portion of the adhesive surface 26 extending laterally from the member 30. The member 30 is shown as extending transversely to the length and across the full width between the sides 18, 20 of the body 16, such that the length of the member 30 and the width of the body 16 are the same or substantially the same, although the member 30 could extend slightly less than or more than the full width, if desired. The member 30 has a height (h) that extends outwardly from the adhesive surface 26 of the side 18 a sufficient distance to be received between the elongate members 12, 14, thereby separating the elongate members 12, 14 in spaced relation from one another. Accordingly, it should be recognized that the height h of the member 30 can be provide as necessary, depending on the diameter of the elongate members 12, 14 being spaced from one another. Further, it is contemplated that the member could be provided having a height h sufficient for a maximum anticipated diameter application, wherein the member 30 can be readily trimmed or shortened thereafter, such as via a utility knife or scissors, for example, for applications requiring a reduced height h. As such, a single item can be stocked for use across a wide variety of applications, wherein the member 30 can be customized for the intended application. The member 30 can be formed from any suitable material so long as the material can withstand the environment. The member 30, for example, and can be provided as a noncompliant or compliant material to facilitate dampening vibration in use. And so, by way of example and without limitation, materials such as cell foams, fiber materials (felt/nonwoven), elastomers or thermoplastic elastomers could be used. The member 30 is shown in FIG. 1, by way of example and without limitation, as being a separate piece of material attached to the side 18 immediately adjacent the end 22, such as via the adhesive surface 26, although it is contemplated that the member 30 could be fixed at any desired location between the ends 22, 24, such as shown in FIGS. 7 and 7A, wherein the member 30 is spaced a predetermined distance from the end 22, thereby providing a shelf on which one of the elongate members 12 can be positioned prior to wrapping the body 16 about the elongate members 12, 14.

In accordance with another aspect of the invention, as shown in FIGS. 8 and 8A, rather than a single member 30 being provided on a body 16, a plurality of members 30, 30' can be provided on a body 16, thereby allowing more than a pair of elongate members, and shown here, by way of example and without limitation, as three elongate members 12, 14, 14' as being separated from one another.

Further yet, in accordance with another aspect of the invention, rather than attaching a separate spacer member to the body 16, the body 16 can be folded upon itself, such as shown in FIGS. 9 and 9A, to establish a member 30", such that the member 30" is formed as a monolithic piece of material with the body 16. The member 30" can be maintained in its protruding configuration via stitching or adhesive, represented generally at 36 for example, wherein the elongate members 12, 14 are located on opposite sides of the member 30", as discussed with regard to the previous embodiments.

In accordance with another aspect of the invention, a method of maintaining elongate members in fixed, spaced relation relative to one another is provided. The method includes aligning a pair of elongate members 12, 14 in generally parallel relation with one another and then, disposing a member 30 between the elongate members 12, 14. Accordingly, the member 30 is received between the elongate members 12, 14 with the elongate members resting on or essentially on an elongate body 16 that is attached to the member 30. If the member 30 is provided having a greater height h than needed, such as being greater than the diameter of the elongate members 12, 14, the height of the member 30 can be readily trimmed, as desired. The method also includes wrapping the elongate body 16 completely about the elongate members 12, 14 and the member 30 and attaching one end 24 of the body 16 to an opposite end 22 of the body 16, such as via an adhesive surface 26 or otherwise, as discussed above. Accordingly, the ends 22, 24 of the body 16 are wrapped in overlapping relation, thereby allowing an exposed side 18 of one end portion 24 having the adhesive surface 26 to be adhered to the overlapped side 20 of the opposite end portion 22 of the body 16. It should be recognized that release paper 28, if provided, covering the adhesive surface 26 can be removed at any desired time prior during the assembly process to expose the desired portion of the underlying adhesive surface 26. Of course, the adhesive surface 26 can be exposed sufficiently so that it becomes adhered to the outer surface of the elongate members 12, 14, thereby further maintaining the elongate members 12, 14 in fixed relation against relative rotation and translation to one another. Further, if the body 16 is provided having a greater length than needed, the length of the body 16 can be trimmed, as desired.

In accordance with another method of maintaining elongate members 12, 14 in fixed, spaced relation to one another, as shown in Figure one elongate member 12 can be disposed on top of the member 30, while the other elongate member 14 can be disposed on an opposite side of the body 16, such as shown in FIG. 5. Then the body 16 can be wrapped about the member 30 and the elongate members 12, 14. Accordingly, the elongate members 12, 14 are separated from one another not only by the member 30, but also by the thickness of the body 16.

Obviously, many modifications and variations of the present invention are possible in light of the above teachings. It is, therefore, to be understood that within the scope of the appended claims, the invention may be practiced otherwise than as specifically described.

What is claimed is:

1. A method of maintaining a plurality of elongate members in fixed, spaced and generally parallel relation to one another, including:
    aligning the plurality of elongate members in generally parallel relation with one another;
    providing a flat, flexible elongate body having opposite inner and outer faces extending between opposite ends with the inner face having an adhesive surface and at least one compliant member extending outwardly therefrom with the adhesive surface extending from the compliant member to at least one of the opposite ends;
    disposing the compliant member between a pair of adjacent elongate members; and
    wrapping the elongate body completely about the elongate members and bringing the opposite ends into overlapping relation with one another and causing the compliant member to conform with the elongate members and adhering the adhesive surface to at least one of the outer face or the elongate members.

2. The method of claim 1 wherein the adhesive surface is adhered to both the outer face and the elongate members.

3. The method of claim 1 further including providing a plurality of members in spaced relation from one another and disposing each of the members between a different pair of the elongate members.

4. The method of claim 1 further including covering the adhesive surface with a release paper, and removing the release paper prior to wrapping the elongate body completely about the elongate members.

\* \* \* \* \*